United States Patent [19]

Hicks et al.

[11] Patent Number: 6,154,651
[45] Date of Patent: Nov. 28, 2000

[54] PERIODIC REEXAMINATION OF DCCH POINTER CHANNEL WHILE CAMPED ON AN ACC

[75] Inventors: Scott G. Hicks, Apex; Nadi S. Findikli, Cary, both of N.C.

[73] Assignee: Ericsson Inc., Research Triangle Park, N.C.

[21] Appl. No.: 09/123,627

[22] Filed: Jul. 28, 1998

[51] Int. Cl.⁷ .................................................. H04Q 7/22
[52] U.S. Cl. .................... 455/434; 455/515; 455/435; 455/450; 455/455; 370/329
[58] Field of Search ................................. 455/434, 435, 455/450, 451, 452, 455, 515; 370/329, 348, 336, 337, 524

[56] References Cited

U.S. PATENT DOCUMENTS

| | | | |
|---|---|---|---|
| 5,212,803 | 5/1993 | Uddenfeldt et al. | 455/434 |
| 5,353,332 | 10/1994 | Raith et al. | 455/455 |
| 5,541,978 | 7/1996 | Brunner et al. | 455/423 |
| 5,570,467 | 10/1996 | Sawyer | 455/515 |
| 5,574,996 | 11/1996 | Raith | 455/161.3 |
| 5,640,677 | 6/1997 | Karlsson | 455/434 |
| 5,722,078 | 2/1998 | Przelomiec et al. | 455/452 |
| 5,768,267 | 6/1998 | Raith et al. | 370/329 |
| 5,778,316 | 7/1998 | Persson et al. | 455/434 |
| 5,953,665 | 9/1999 | Mattila | 455/434 |

FOREIGN PATENT DOCUMENTS

| | | | |
|---|---|---|---|
| 0 779 751 A2 | 12/1996 | European Pat. Off. | H04Q 7/22 |
| WO 97/34438 | 9/1997 | WIPO | H04Q 7/38 |

*Primary Examiner*—Edward F. Urban
*Assistant Examiner*—Isaak R. Jama
*Attorney, Agent, or Firm*—Wood, Phillips, VanSanten, Clark & Mortimer

[57] ABSTRACT

A method and system used in a wireless network that provides communication service on both analog control channels (ACCs) and digital control channels (DCCHs) controls access to wireless services by a mobile station. The method comprises the steps of acquiring wireless services on a select ACC; periodically receiving a pointer to a preferred DCCH as part of a message received from the wireless network via the ACC; initially attempting to acquire wireless service on the preferred DCCH, including determining if received signal strength is acceptable and available service features are acceptable, and if not, then indicating the preferred DCCH as rejected; storing information on the rejected DCCH; and subsequently attempting to acquire wireless service on the rejected DCCH only if the DCCH was rejected due to received signal strength not being acceptable.

22 Claims, 8 Drawing Sheets

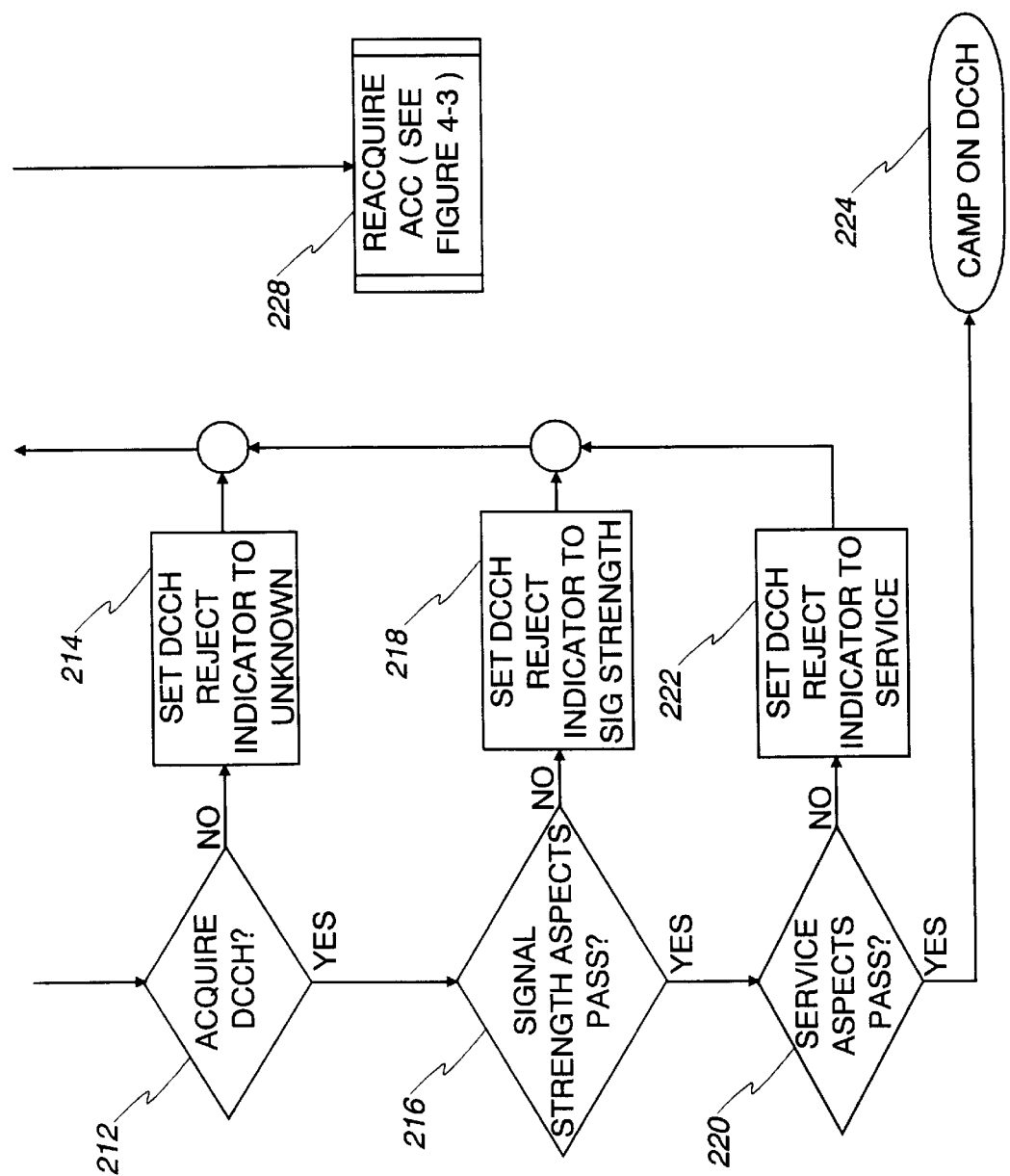

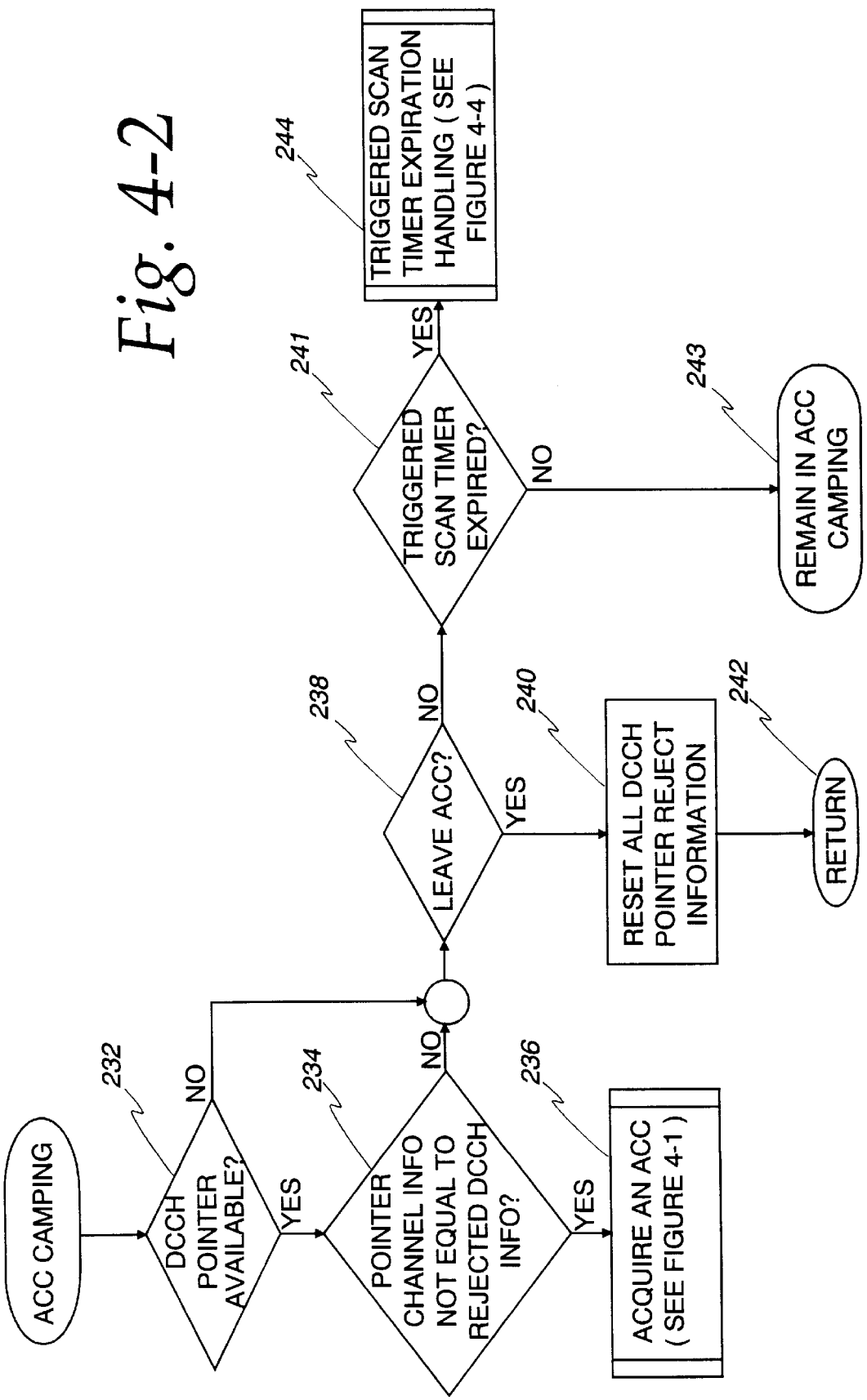

PERIODIC REEXAMINATION OF DCCH POINTER CHANNEL WHILE CAMPED ON AN ACC

FIELD OF THE INVENTION

This invention relates to a system and method for acquiring service in a wireless network and, more particularly, to periodic reexamination of digital control channels while camped on an analog control channel.

BACKGROUND OF THE INVENTION

A cellular mobile telecommunication system includes a mobile station communicating with any one of a plurality of geographically spaced base stations in a wireless network. The wireless network provides communication on both analog control and voice channels and digital control and voice channels. Depending upon the type of service a user subscribes to not all of these channels are used. Older cellular systems included only analog control and voice channels (ACC and AVC, respectively). Subsequently, digital voice channels (DVCH) were added. However, only newer digital phones could communication on the digital voice channels. More recently, wireless network systems have added digital control channels (DCCH) which provide additional control features. Again, only a phone configured to communicate on a digital control channel is capable of doing so. Nevertheless, all of the phones are downwardly compatible so that even digital-type phones can communicate on analog voice and control channels.

Due to network system design, an analog control channel tends to be easier to acquire than a digital control channel. Even mobile stations equipped to communicate with digital control channels will often initially acquire service on an analog control channel. However, digital control channels are the preferred service provider for such mobile stations, referred to as IS-136 mobile stations. Digital control channels are preferred because they provide more features and longer standby time, among other factors. An IS-136 TDMA cellular system provides the capability for an ACC to contain a control channel information message in its overhead message train (OMT) that serves as a pointer to a DCCH for IS-136 compatible mobile stations. These mobile stations can use the DCCH pointer information to facilitate a search for digital service, since ACCs are standardly confined to a subset of frequencies defined in IS-136, whereas DCCHs can be located at any IS-136 defined frequency.

A mobile station that can use the DCCH pointer normally acquires synchronization on the DCCH and then proceeds to read the overhead information to determine whether or not to remain on the DCCH. A DCCH has to be suitable from both signal strength and service perspectives. The broadcast information provides a minimum received signal strength (RSS) necessary for the mobile station to camp on the DCCH. If the mobile station's RSS for the given DCCH is not high enough to meet the broadcast criteria, then the mobile station leaves the channel to attempt to acquire service on another channel. This channel will typically be the analog control channel from which the mobile station obtained the DCCH pointer. Once the mobile station is back on the ACC, it will continue to receive the DCCH pointer with a maximum periodicity of five seconds.

If the mobile station could not camp on the DCCH solely because of received signal strength, then it is desirable for the mobile station to recheck the camping suitability of the DCCH sometime in the future since signal conditions tend to be very dynamic. Prior solutions have rechecked the camping suitability of the DCCH each time an OMT is received on the ACC. With this method, the mobile station would only remain on an ACC for a maximum of five seconds. The mobile station might not receive pages for incoming calls and have difficulty originating a call. Alternative proposed solutions have been to start a timer after an unsuccessful DCCH acquisition, and after its expiration recheck the camping suitability of the DCCH. This necessitates the running of a dedicated timer within the mobile station's operating system and applies a fixed time for rechecking that may not be optimal for all service providers. Particularly, the service providers would have no control over how often the mobile station leaves the serving ACC to find service on a DCCH. Still another proposed solution does not recheck the camping suitability of the DCCH again as long as the mobile station remains on the same ACC. However, this could result in the mobile station not acquiring service on the DCCH at some point in the future, even though DCCH service is desired over ACC service.

The present invention is directed to solving one or more of the problems discussed above in a novel and simple manner.

SUMMARY OF THE INVENTION

In accordance with the invention there is disclosed a system and method which periodically attempts to acquire service on a DCCH only if the DCCH was rejected due to received signal strength not being acceptable.

Broadly, there is disclosed herein a method for use in a wireless network that provides communication service on both analog control channels (ACCs) and digital control channels (DCCHs) to control access to wireless services by a mobile station. The method comprises the steps of acquiring wireless services on a select ACC; periodically receiving a pointer to a preferred DCCH as part of a message received from the wireless network via the ACC; initially attempting to acquire wireless service on the preferred DCCH, including determining if received signal strength is acceptable and available service features are acceptable, and if not, then indicating the preferred DCCH as rejected; storing information on the rejected DCCH; and subsequently attempting to acquire wireless service on the rejected DCCH only if the DCCH was rejected due to received signal strength not being acceptable.

It is a feature of the invention that the storing step includes storing channel number, hyperband and digital verification color code associated with the rejected DCCH. Also stored is an indicator of the reason that the DCCH acquisition was rejected, particularly, as due to signal strength, due to service, or unknown. Also stored is a minimum signal strength necessary to camp on the rejected DCCH.

It is another feature of the invention that in subsequently attempting to acquire wireless service on the rejected DCCH, the mobile station obtains a signal strength measurement. The mobile station averages signal strength measurements. The DCCH is reset to preferred if the subsequent received signal strength is acceptable.

It is a further feature of the invention that the storing step includes storing information indicating if a wireless service provider for the acquired ACC is acceptable or unacceptable. A triggered scan time is started if on an unacceptable service provider or if on an acceptable service provider and the rejected DCCH was rejected because received signal strength was not acceptable. The DCCH is reset to preferred after the triggered timer expires.

There is disclosed in accordance with another aspect of the invention a mobile station for use in a wireless network that provides communication services on both analog control channels (ACCs) and digital control channels (DCCHs). The mobile station includes a receiver and transmitter for communicating with the wireless network via ACCs and DCCHs. A programmed controller is operable to control the receiver and transmitter and operates in accordance with a program stored in a memory to acquire service. The program also includes acquiring wireless service on a select ACC, periodically receiving a pointer to a preferred DCCH as part of a message received from the wireless network via the ACC, initially attempting to acquire wireless services on the preferred DCCH, including determining if received signal strength is acceptable and available service features are acceptable, and if not, then indicating the preferred DCCH as rejected, storing in the memory information on the rejected DCCH, and subsequently attempting to acquire wireless service on the rejected DCCH only if the DCCH was rejected due to received signal strength not being acceptable.

Further features and advantages of the invention will be readily apparent from the specification and from the drawing.

BRIEF DESCRIPTION OF THE DRAWING

FIGS. 3-1 and 3-2 are a flow chart illustrating operation of a program implemented in the mobile station of FIG. 2 illustrating usage of DCCH broadcast information and determination of DCCH pointer pursuance; and FIGS. 4-1, 4-2, 4-3 and 4-4 are a flow chart illustrating operation of a program implemented in the mobile station of FIG. 2 for periodic reexamination of a DCCH pointer channel while camped on an ACC as part of intelligent roaming.

DETAILED DESCRIPTION OF THE INVENTION

Figure 1:
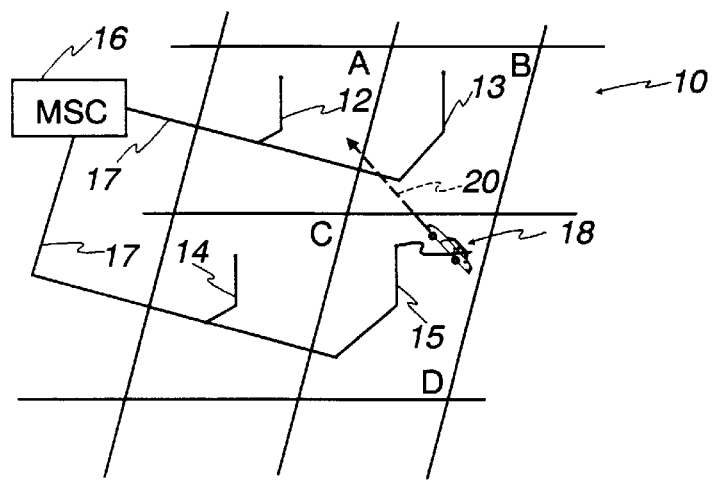
FIG. 1 is a perspective view of a cellular mobile telecommunication system utilizing a mobile station according to the invention.

Referring initially to FIG. 1, a cellular mobile telecommunication system 10 of conventional configuration is illustrated. As is well known, the cellular system 10 is defined by plural cells, including representative cell locations A, B, C and D. Each cell location A–D includes a respective base station 12, 13, 14 and 15. Each of the base stations 12–15 communicates with a mobile switching center 16 via an intercellular trunk 17. A mobile station, represented at 18, may consist of, for example, a cellular phone carried by a user in an automobile. However, as is apparent, the mobile station 18 may comprise any known form of mobile station capable of communicating within a cellular mobile telecommunication system 10.

The telecommunication system 10 is operable to select from one of the base stations 12–15 to communicate with the mobile station 18. As illustrated, the mobile station 18 is located in cell location D. Consequently, communications with the mobile station 18 would be handled by the base station 15. If the mobile station 18 is stationary, then communications would likely remain with the base station 15. However, if the mobile station 18 is moving, then it would cross into different cells. For example, as illustrated, the mobile station 18 might be moving in a direction as indicated by the dashed line 20 and traverse into cell location B and subsequently cell location A. The mobile station 18 would therefore switch communications from the base station 15 to the base station 13, and subsequently the base station 12, as the mobile station traverses from cell location D to respective cell locations B and A.

As is known, an IS-136 TDMA cellular system has analog voice channels (AVCs) and analog control channels (ACCs). These systems also include digital voice channels (DVCHs) and digital control channels (DCCHs). The present invention is directed to how the mobile station 18 acquires service on channels and, most advantageously, on a DCCH. The cellular telecommunication system 10 does not itself form part of the invention.

Figure 2:
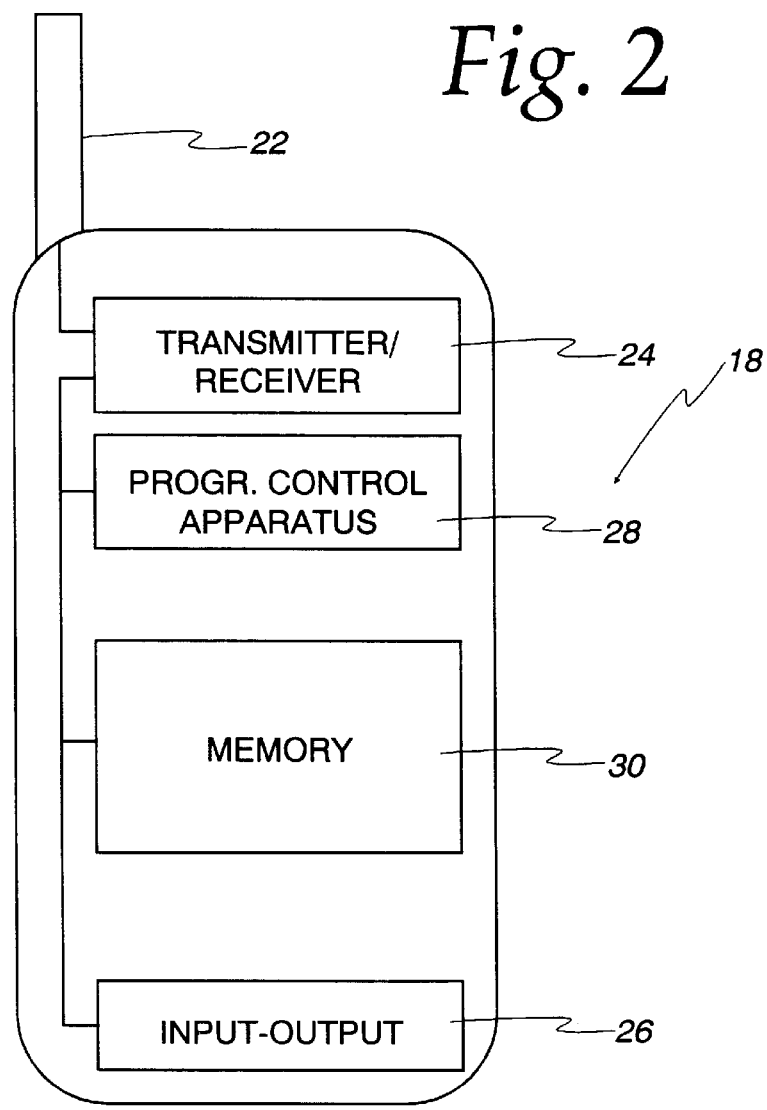
FIG. 2 is a generalized block diagram of a mobile station according to the invention.

Referring to FIG. 2, the mobile station 18 is illustrated in greater detail. The mobile station 18 comprises an IS-136 mobile station which, advantageously, communicates in an IS-136 TDMA cellular system. Standard IS-136 forms a compatibility standard for cellular mobile telecommunication systems. This standard insures that a mobile station can obtain service in any cellular system manufactured according to that standard. The standard for IS-136 is incorporated by reference herein.

The mobile station 18, also called a wireless telephone, includes an antenna 22 for sending and receiving radio signals between itself and a wireless network, represented by the telecommunication system 10 of FIG. 1. A transmitter/receiver 24 is connected to the antenna 22 to respectively broadcast and receive radio signals. The receiver portion demodulates, demultiplexes and decodes the radio signals into a control channel and a voice channel, as discussed above. The speech or data are delivered to an input/output device 26, such as a speaker, display or other output device. Received signals are also delivered to a programmable control apparatus 28. The programmable control apparatus 28 controls and coordinates the functioning of the mobile station 18 responsive to messages on the control channel using programs and data stored in a memory 30 so that the mobile station 18 can operate within the wireless network. The programmable control apparatus 28 also controls the operation of the mobile station 18 responsive to input from the input/output block 26. The inputs may include a keypad. The programmable control apparatus controls the operation of the transmitter/receiver 24 responsive to control messages and user inputs.

In accordance with the invention, a solution is provided for periodically determining the signal strength acceptability of a rejected DCCH pointed to by cyclical information in an ACC overhead message train (OMT). A periodic measurement of the received signal strength (RSS) of a rejected DCCH pointer channel is obtained, since DCCHs are preferred over ACCs. A usage of RSS criteria given in the DCCH broadcast information determines when to retry a DCCH acquisition. This strives to achieve a reduction of the number of missed ACC pages, or incoming calls, to a minimum while using an algorithm that already exists presently in IS-136 compatible mobile stations. Particularly, the system and method utilizes an existing method of measuring RSS of a DCCH pointer channel during idle time in an ACC, but uses the RSS criteria obtained in the DCCH broadcast information to determine when to retry the DCCH acquisition.

A mobile station, such as the mobile station 18, that can use the DCCH pointer from the ACC will normally acquire synchronization on the DCCH and will then proceed to read the overhead information to determine whether or not to remain on the DCCH. A DCCH has to be suitable from both the signal strength and service perspectives. The broadcast information provides a minimum RSS necessary for the mobile station to camp on the DCCH according to known standards. If the mobile station's RSS for the given DCCH is not high enough to meet the broadcast criteria, then the mobile station must leave the channel to attempt to acquire service on another channel. This channel is typically the ACC from which the mobile station obtained the DCCH pointer. Once the mobile station is back on the ACC, it will continue to receive the DCCH pointer information with a maximum periodicity of five seconds. In accordance with the invention, the DCCH broadcast information is used in determining when to again attempt to acquire service on a DCCH.

Figures 1A, 3:
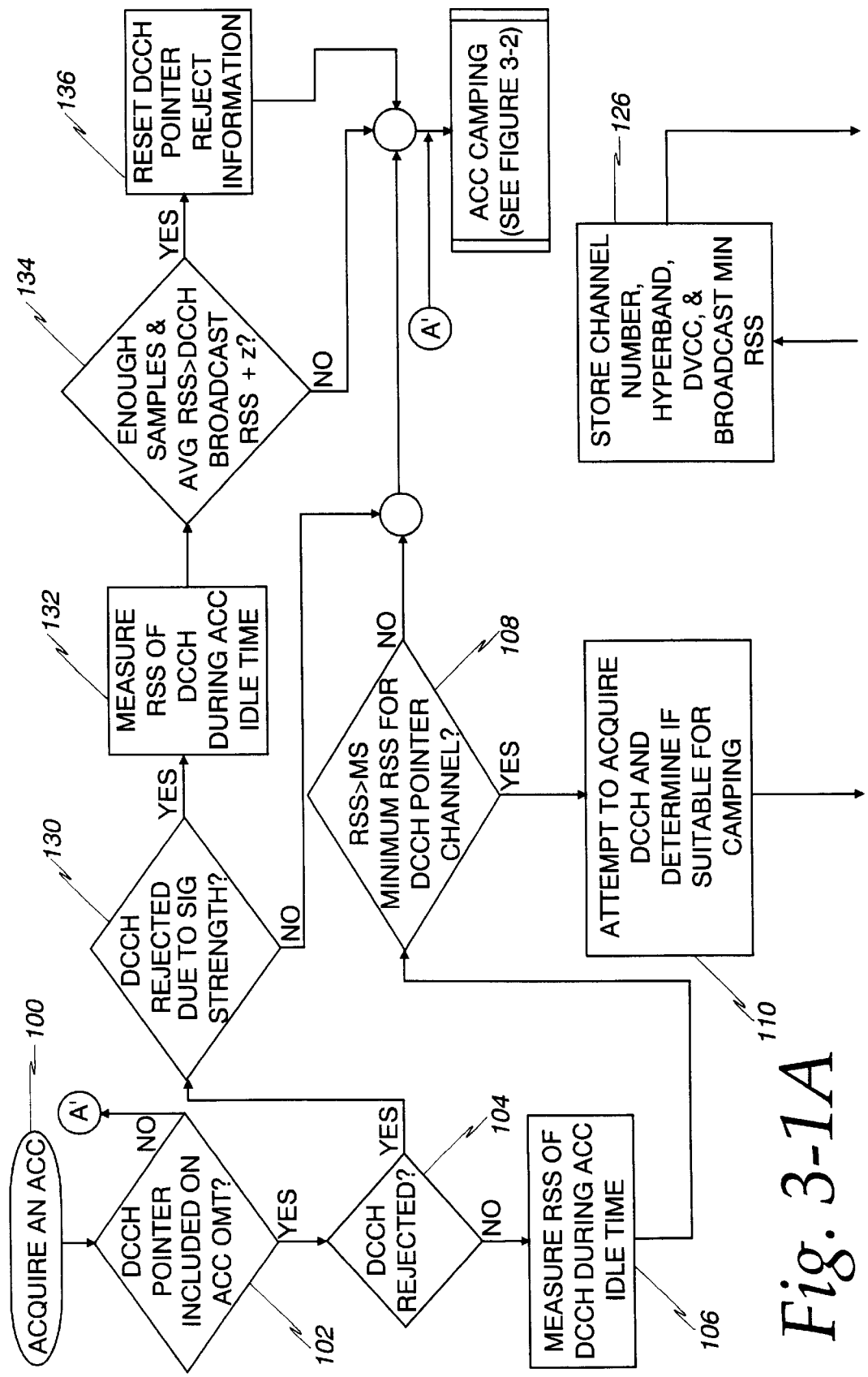
Figures 1B, 3:
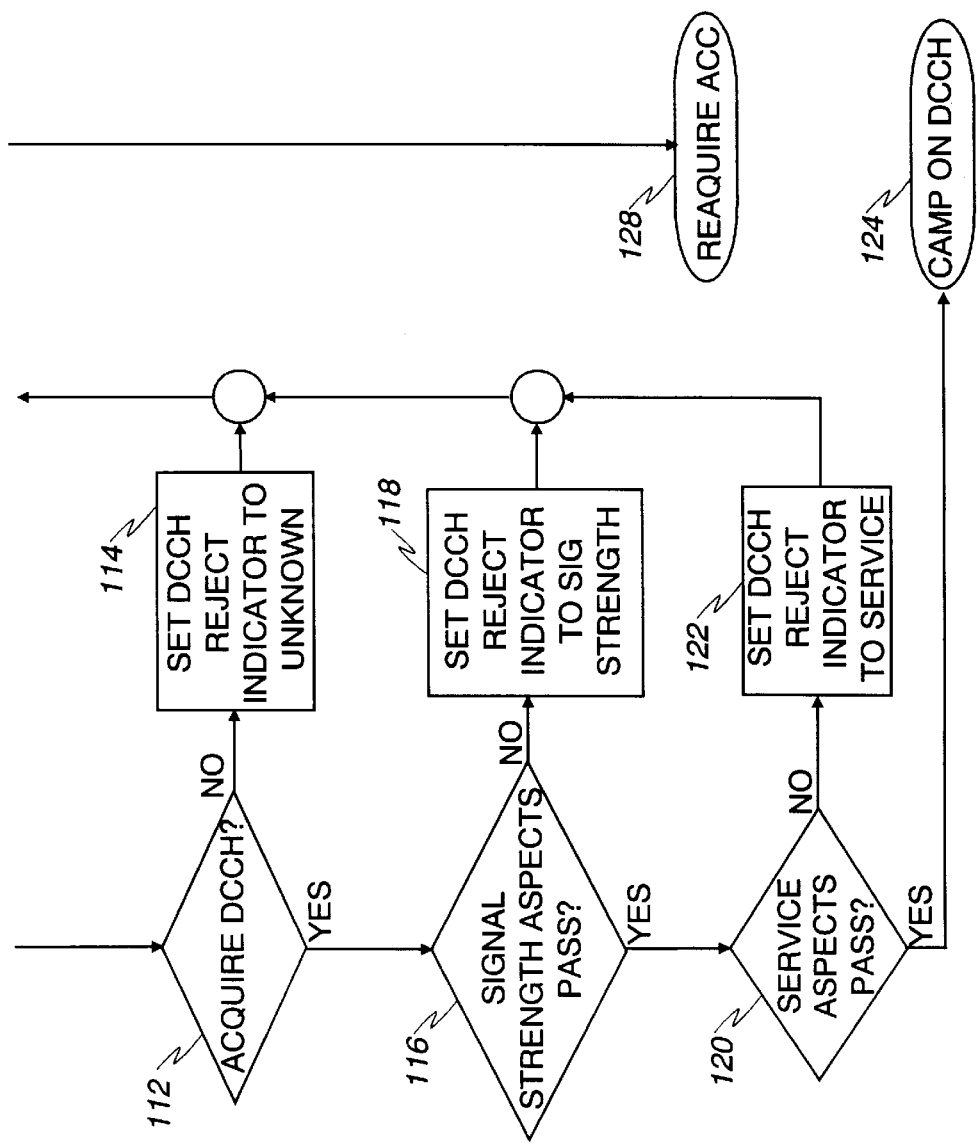
Figures 2, 3:
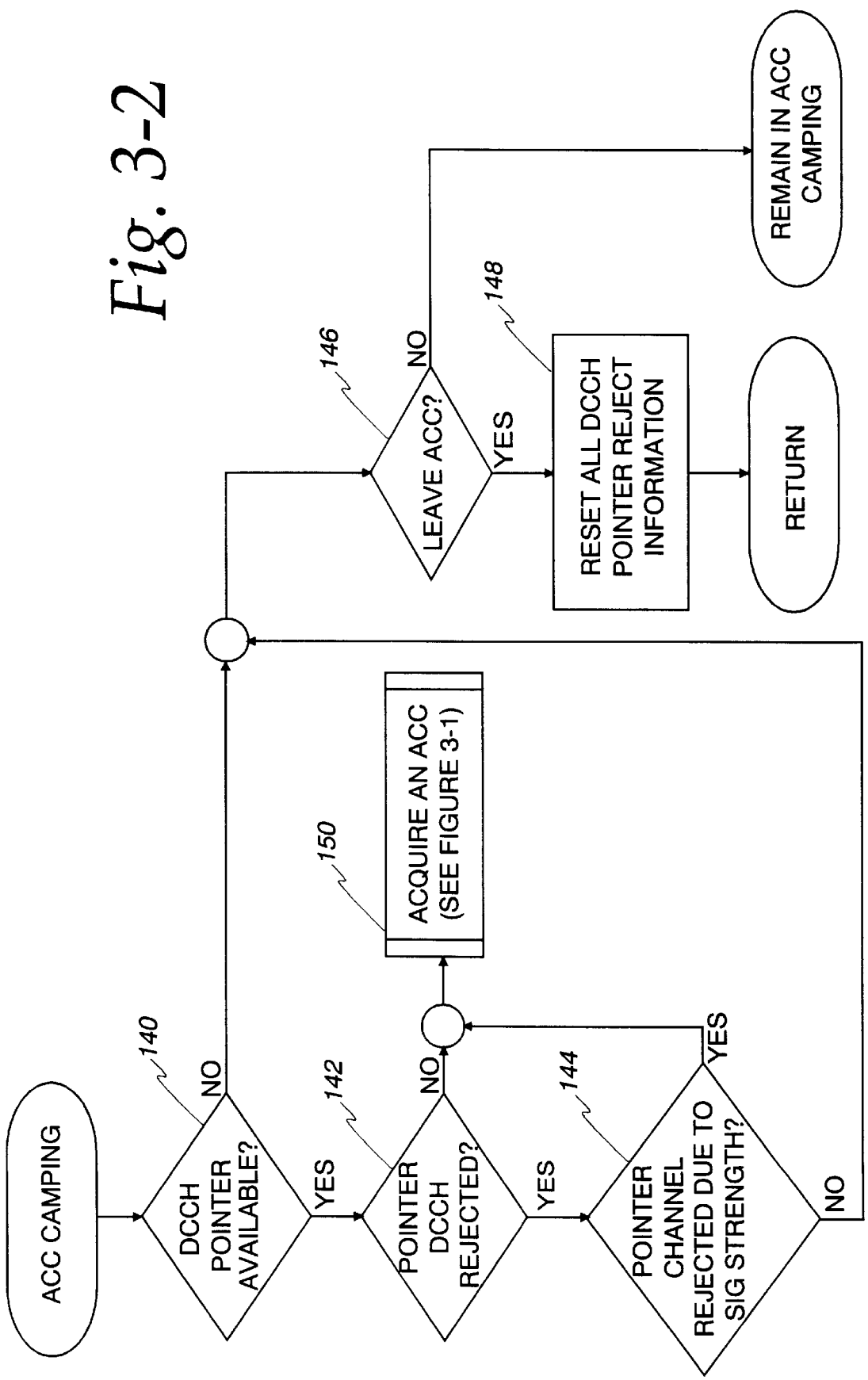

Referring to FIG. 3-1, a flow chart illustrates operation of a program implemented in the programmable control apparatus 28 of FIG. 2 for acquiring such service. As will be appreciated, the programming control apparatus 28 implements many different programming functions. This application relates to camping on particular control channels. Therefore, only flow charts related to that feature are illustrated.

The flow chart, as identified at a node 100, is for a routine to acquire an ACC. This routine is called by the programmable control 28 when the mobile station 18 has acquired an ACC. A decision block 102 determines if a DCCH pointer is included on the ACC OMT. If so, then a decision block 104 determines if the DCCH has been tagged as rejected. If not, then the mobile station performs an RSS measurement of the DCCH during the idle ACC time at a block 106. A decision block 108 determines if the RSS is greater than the mobile station minimum RSS for the DCCH pointer channel. If so, then the mobile station attempts to acquire the DCCH and determine if it is suitable for camping at a block 110. A decision block 112 determines if the mobile station 18 was successful in acquiring the DCCH. If not, then a DCCH reject indicator is set to "unknown" at a block 114. If the mobile station could acquire the DCCH at the block 112, then a decision block 116 determines if signal strength aspects of the service are acceptable, as discussed above. If not, then the DCCH reject indicator is set to "signal strength" at a block 118. If the signal strength aspects did pass at the decision block 116, then a decision block 120 determines if service aspects of the DCCH are acceptable. The service aspects are acceptable if the DCCH provides the service capabilities the user subscribes to. If not, then the DCCH reject indicator is set to "service" at a block 122. If the service aspects do pass, then control proceeds to a node 124, causing the mobile station to camp on the particular DCCH. The control algorithms described herein are no longer used thereafter until such time as the mobile station again is camped on an ACC.

From any of the blocks 114, 118, or 122, control proceeds to a block 126 which is operable to store in the memory 30 the channel number, hyperband, DVCC and minimum RSS calculated from the broadcast information to be necessary to camp. The control then reacquires an ACC at a node 128.

In subsequent cycles, assuming the DCCH was rejected in a prior cycle, then from the decision block 104 control would proceed to a decision block 130, which determines if the DCCH was rejected due to signal strength. If so, then the control attempts to acquire wireless service on the rejected DCCH by measuring RSS of the DCCH during ACC idle time at a block 132. In accordance with the invention, when the mobile station has obtained a minimum number of RSS measurements for the DCCH pointer channel, it takes an average and compares the average to the stored DCCH broadcast RSS criteria, and when the RSS average is found to be Z db greater than the stored DCCH broadcast RSS, then the mobile station will reset the DCCH pointer reject information. This function is implemented at a decision block 134. Particularly, if sufficient samples have been taken and the average RSS is greater than the DCCH broadcast RSS+Z, then the DCCH pointer reject information is reset at a block 136. If not, then control proceeds to an ACC camping routine illustrated in FIG. 3-2. The ACC camping routine is also implemented from any of blocks 102, 108 or 130 owing to a negative result, and also after resetting the reject information at the block 136.

FIG. 3-2 illustrates the ACC camping routine. This routine begins at a block 140, which determines if a DCCH pointer is available. If so, then a decision block 142 determines if the DCCH pointed to is rejected. If so, then a decision block 144 determines if the channel is rejected due to signal strength. If not, then a decision block 146 determines whether or not it is necessary to leave the ACC. The mobile station 18 may leave the ACC, for example, if the mobile station moves to a different cell. If it is necessary to leave the ACC, then all DCCH pointer reject information is reset at a block 148 and the routine then ends. If it is not necessary to leave the ACC, then the control remains in the ACC camping mode.

If the DCCH pointer was not rejected, as determined at the decision block 142, or it was rejected due to signal strength at the block 144, then control proceeds to a block 150 which implements the acquire an ACC routine illustrated in FIG. 3-1.

Thus, in accordance with this aspect of the invention the mobile station only attempts to reacquire the rejected DCCH if it was rejected due to signal strength criteria, since signal strength is dynamic and service aspects are more static. Thus, this method does not require a dedicated timer for rechecking the DCCH and does not require continuous measurement of the RSS of the DCCH, since the RSS snapshots can only be taken when the control channel information message is received, which will be a few seconds apart. This method will save current and increase standby time by not continuously measuring the RSS. This also reduces the number of missed ACC pages, i.e., incoming calls, to a minimum.

Figures 1A, 4:
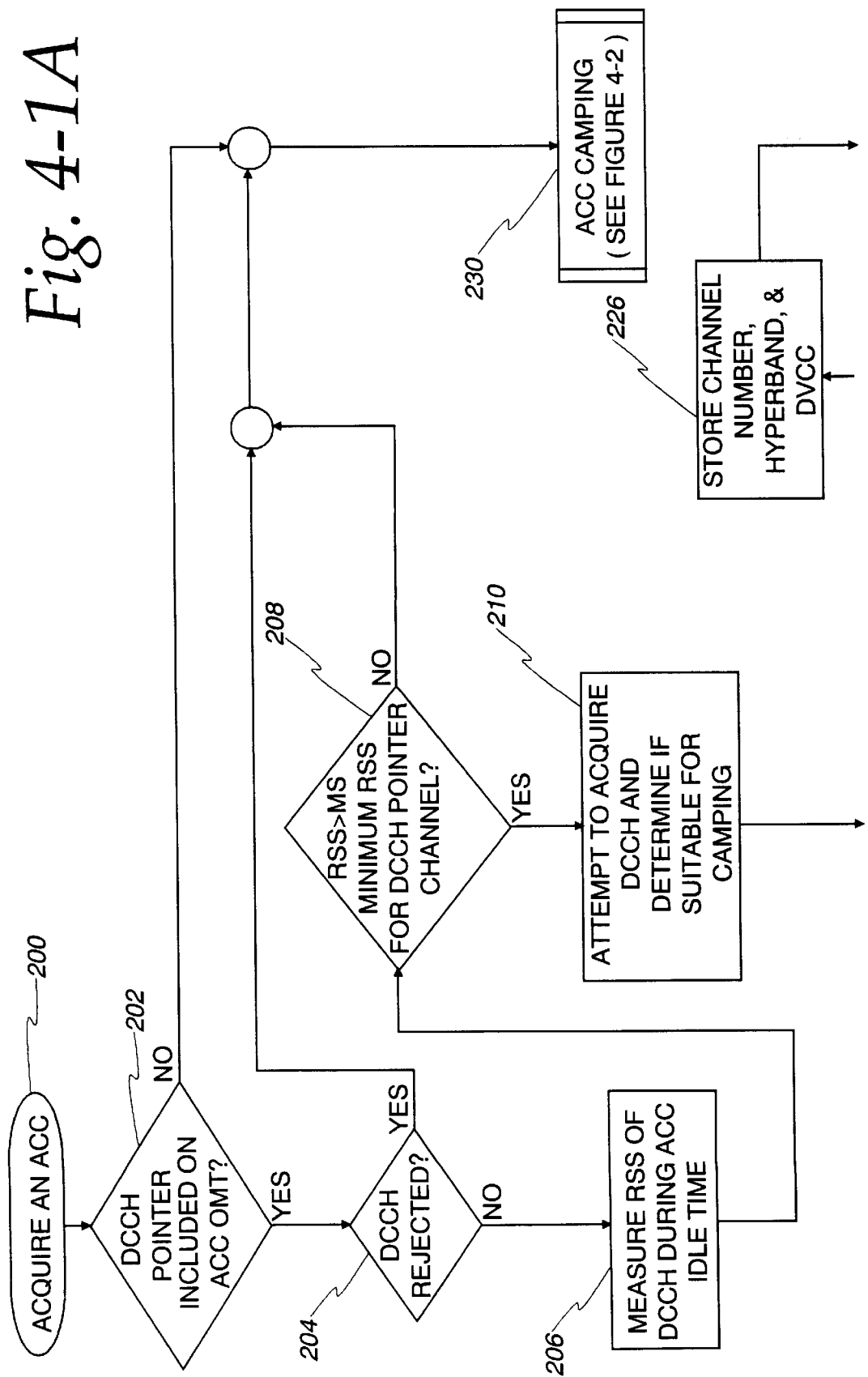
Figures 3, 4:
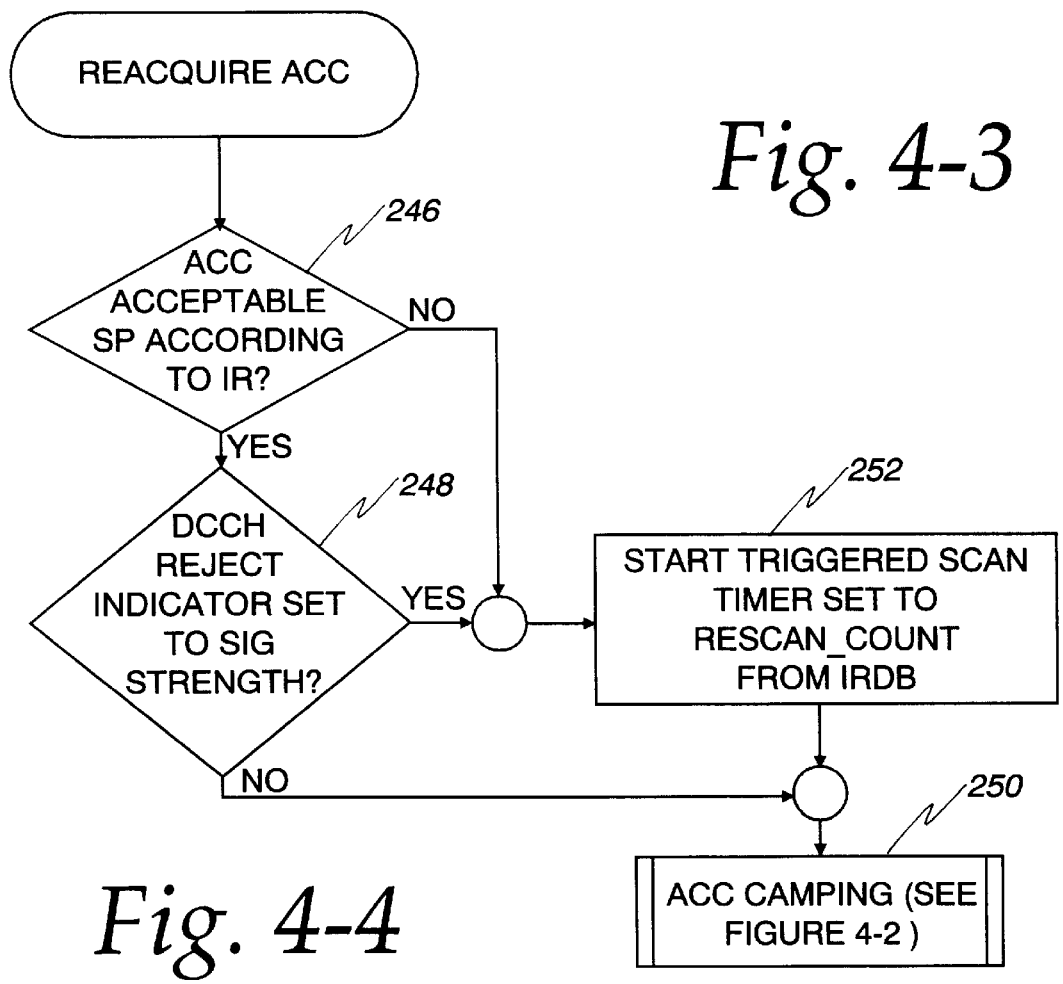
Figure 4:
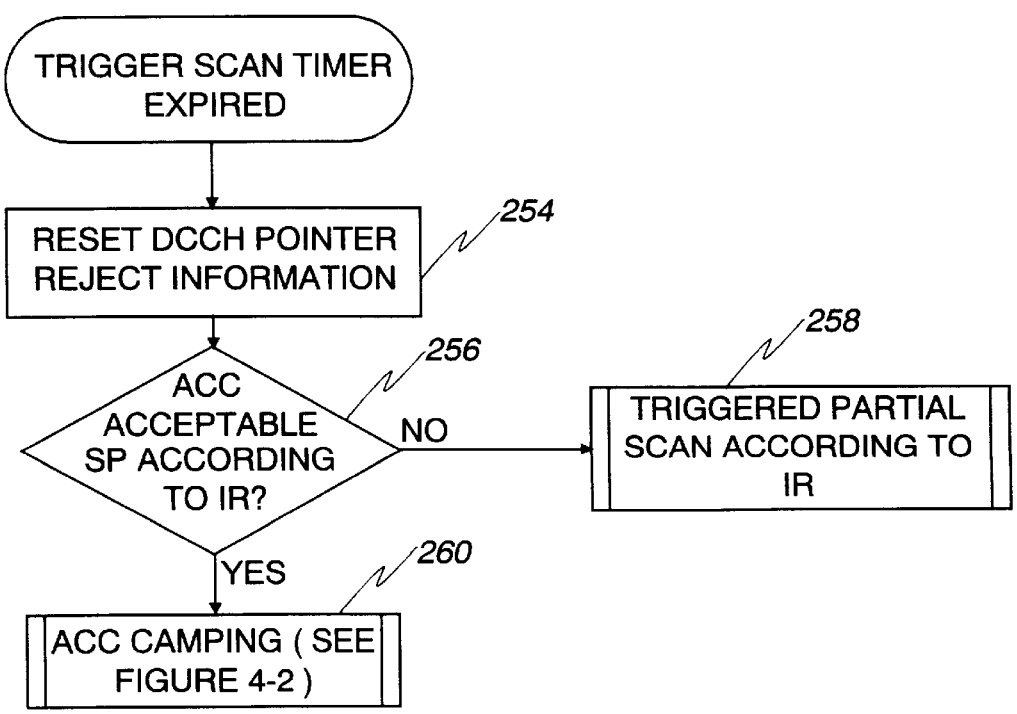

Referring to FIGS. 4-1 to 4-4, a flow diagram illustrates a program implemented in the programmable control apparatus 28 of FIG. 2 as part of intelligent roaming (IR) utilizing triggered scans.

FIG. 4-1 illustrates a flow diagram of an acquire an ACC routine. The flow chart begins at a node 200, which is called when the mobile station 18 has acquired an ACC. A decision block 202 determines if a DCCH pointer is included on the ACC OMT. If so, then a decision block 204 determines if the DCCH has been tagged as rejected. If not, then the mobile station performs an RSS measurement of the DCCH during the idle ACC time at a block 206. A decision block 208 determines if the RSS is greater than the mobile station minimum RSS for the DCCH pointer channel. If so, then the mobile station attempts to acquire the DCCH and determine if it is suitable for camping at a block 210. A decision block 212 determines if the mobile station 18 was successful in acquiring the DCCH. If not, then a DCCH reject indicator is set to "unknown" at a block 214. If the mobile station could acquire the DCCH at the block 212, then a decision block 216 determines if signal strength aspects are acceptable, as discussed above. If not, then the DCCH reject indicator is set to "signal strength" at a block 218. If the signal strength aspects did pass at the decision block 216, then a decision block 220 determines if service aspects of the DCCH are acceptable, as discussed above. If not, then the DCCH reject indicator is set to "service" at a block 222. If the service aspects are acceptable, then control proceeds to a node 224, causing the mobile station to camp on the particular DCCH. The control algorithms described herein are no longer used thereafter until such time as the mobile station again is camped on an ACC.

From any of the blocks 214, 218, or 222, control proceeds to a block 226 which is operable to store in the memory 30 the channel number, hyperband, DVCC and minimum RSS calculated from the broadcast information to be necessary to camp. The control then reacquires an ACC at a node 228 using a routine illustrated in FIG. 4-3.

If the DCCH pointer was not included in the OMT, as determined at the decision block 202, the DCCH was rejected as determined at the decision block 204, or the RSS was not greater than the minimum as determined at the decision block 208, then control proceeds to a block 230 which implements an ACC camping routine illustrated in FIG. 4-2.

Referring to FIG. 4-2, the ACC camping routine is illustrated. This routine begins at a block 232, which determines if a DCCH pointer is available. If so, then a decision block 234 determines if the pointer channel information is not equal to the rejected DCCH information. The pointer channel information is that stored at the block 226 of FIG. 4-1. If so, then control returns to the acquire an ACC routine shown in FIG. 4-1. If the DCCH pointer was not available, as determined at the decision block 232, or the pointer channel information is equal to the rejected DCCH information, then control proceeds to a decision block 238, which determines if it is necessary to leave the ACC. If so, all DCCH pointer reject information is reset at a block 240 and control returns to normal functioning at a node 242. If it is not necessary to leave the ACC, then a decision block 240 determines if a triggered scan timer has expired. If not, then the control remains in the ACC camping mode, as illustrated at node 242. If a triggered scan timer has expired, then a trigger scan timer expired routine, illustrated in FIG. 4-4 is called at a block 244.

Referring to FIG. 4-3, the reacquire ACC routine called at the block 228 of FIG. 4-1 is illustrated. This routine begins at a block 246, which determines if an ACC is an acceptable service provider according to intelligent roaming criteria. A service provider is considered acceptable if it is the home service provider of the mobile station user or is a partner provider. A service provider is considered unacceptable if it is not the home or partner provider and is not a forbidden provider. If the ACC is acceptable, then a decision block 248 determines if the DCCH reject indicator is set to signal strength. If not, then control returns to the ACC camping routine of FIG. 4-2. If so, or if the ACC was not an acceptable service provider, as determined at the decision block 246, then a triggered scan timer is started at a block 252 to a value RESCAN_COUNT from an intelligent roaming database (IRDB). Control then proceeds to the block 250 to implement the ACC camping routine.

Referring to FIG. 4-4, a flow chart of the trigger scan timer expired routine is illustrated. This routine begins at a block 254 that resets the DCCH pointer reject information. A decision block 256 determines if the ACC is an acceptable service provider. If not, then a triggered partial scan according to intelligent roaming standards is implemented at a block 258. If the ACC is an acceptable service provider, then control proceeds to the ACC camping routine of FIG. 4-2 at a block 260.

Thus, in accordance with this aspect of the invention the mobile station 18 only rechecks the rejected DCCH if it was rejected due to signal strength criteria, since signal strength is dynamic and service aspects are more static. It does not require a dedicated timer for rechecking the DCCH. Instead, it uses the already existing triggered scan timer from intelligent roaming. The mobile station 18 uses the triggered scan time defined by parameters downloaded into the mobile station 18 by the home service provider. Thus, the home service provider has control of how often the mobile station 18 can leave ACC service to attempt service acquisition on a DCCH. This control is desirable since when the mobile station is checking the DCCH, it no longer has service on the ACC. The service provider can determine the tradeoffs of missed incoming calls and preferred service as it would for any other triggered scan.

More particularly, this is accomplished by starting the triggered scan timer if the mobile station is on an unacceptable service provider. Otherwise, if the mobile station is on an acceptable service provider according to intelligent roaming, then the triggered scan timer is started only if the DCCH was rejected due to signal strength. When the triggered scan timer expires, the DCCH pointer rejection information is reset and triggered scan processing is performed according to IR requirements when on an unacceptable service provider and/or returned to reading the ACC OMT when on an acceptable service provider. Whenever the mobile station reads a control channel information message again on the ACC OMT, it can reattempt to acquire service on the DCCH pointed to since it is no longer rejected.

Thus, in accordance with the invention there is disclosed a mobile station that attempts to reacquire wireless service on a rejected DCCH if the DCCH was rejected due to received signal strength not being acceptable.

We claim:

1. A method for use in a wireless network that provides communication services on both analog control channels (ACCs) and digital control channels (DCCHs), to control access to wireless services by a mobile station, the method comprising the steps of:

acquiring wireless services on a select ACC;

periodically receiving a pointer to a preferred DCCH as part of a message received from the wireless network via the ACC;

initially attempting to acquire wireless services on the preferred DCCH, including determining if received signal strength is acceptable and available service features are acceptable, and if not then indicating the preferred DCCH as rejected;

storing information on the rejected DCCH; and subsequently attempting to acquire wireless service on the rejected DCCH if the DCCH was rejected due to receive signal strength not being acceptable.

2. The method of claim 1 wherein the storing step includes storing channel number, hyperband and digital verification color code associated with the rejected DCCH.

3. The method of claim 1 wherein the storing step includes storing an indicator of the reason that the DCCH acquisition was rejected.

4. The method of claim 3 wherein the storing step includes storing the reasons that the DCCH was rejected as due to signal strength, due to service or unknown.

5. The method of claim 1 wherein the storing step includes storing a minimum signal strength necessary to camp on the rejected DCCH.

6. The method of claim 1 wherein in subsequently attempting to acquire wireless service on the rejected DCCH the mobile station obtains a signal strength measurement.

7. The method of claim 6 further comprising the step of averaging signal strength measurements.

8. The method of claim 6 wherein further comprising the step of resetting the DCCH to preferred if the subsequent received signal strength is acceptable.

9. The method of claim 1 wherein the storing step includes storing information indicating if a wireless service provider for the acquired ACC is acceptable or unacceptable.

10. The method of claim 9 further comprising the step of starting a triggered scan timer if on an unacceptable service provider or if on an acceptable service provider and the rejected DCCH was rejected because received signal strength was not acceptable.

11. The method of claim 10 further comprising the step of resetting the DCCH to preferred after the triggered scan timer expires.

12. A mobile station for use in a wireless network that provides communication services on both analog control channels (ACCs) and digital control channels (DCCHs), the mobile station comprising:

a receiver and transmitter for communicating with the wireless network via ACCs and DCCHs; and a programmed controller operable to control the receiver and transmitter and operating in accordance with a program stored in a memory to acquire service including acquiring wireless services on a select ACC, periodically receiving a pointer to a preferred DCCH as part of a message received from the wireless network via the ACC, initially attempting to acquire wireless services on the preferred DCCH, including determining if received signal strength is acceptable and available service features are acceptable, and if not then indicating the preferred DCCH as rejected, storing in the memory information on the rejected DCCH, and subsequently attempting to acquire wireless service on the rejected DCCH if the DCCH was rejected due to receive signal strength not being acceptable.

13. The mobile station of claim 12 wherein the memory stores channel number, hyberband and digital verification color code associated with the rejected DCCH.

14. The mobile station of claim 12 wherein the memory stores an indicator of the reason that the DCCH acquisition was rejected.

15. The mobile station of claim 14 wherein the memory stores the reasons that the DCCH was rejected as due to signal strength, due to service or unknown.

16. The mobile station of claim 1 wherein the memory stores a minimum signal strength necessary to camp on the rejected DCCH.

17. The mobile station of claim 12 wherein the controller program in subsequently attempting to acquire wireless service on the rejected DCCH obtains a received signal strength measurement.

18. The mobile station of claim 17 wherein the program averages signal strength measurements.

19. The mobile station of claim 17 wherein the program resets the DCCH to preferred if the subsequent received signal strength is acceptable.

20. The mobile station of claim 12 wherein the memory stores information indicating if a wireless service provider for the acquired ACC is acceptable or unacceptable.

21. The mobile station of claim 20 wherein the program starts a triggered scan timer if on an unacceptable service provider or if on an acceptable service provider and the rejected DCCH was rejected because received signal strength was not acceptable.

22. The mobile station of claim 21 wherein the program resets the DCCH to preferred after the triggered scan timer expires.

* * * * *